H. G. SAAL.
BRAKING MECHANISM.
APPLICATION FILED JUNE 21, 1917.
1,263,806.
Patented Apr. 23, 1918.
2 SHEETS—SHEET 1.
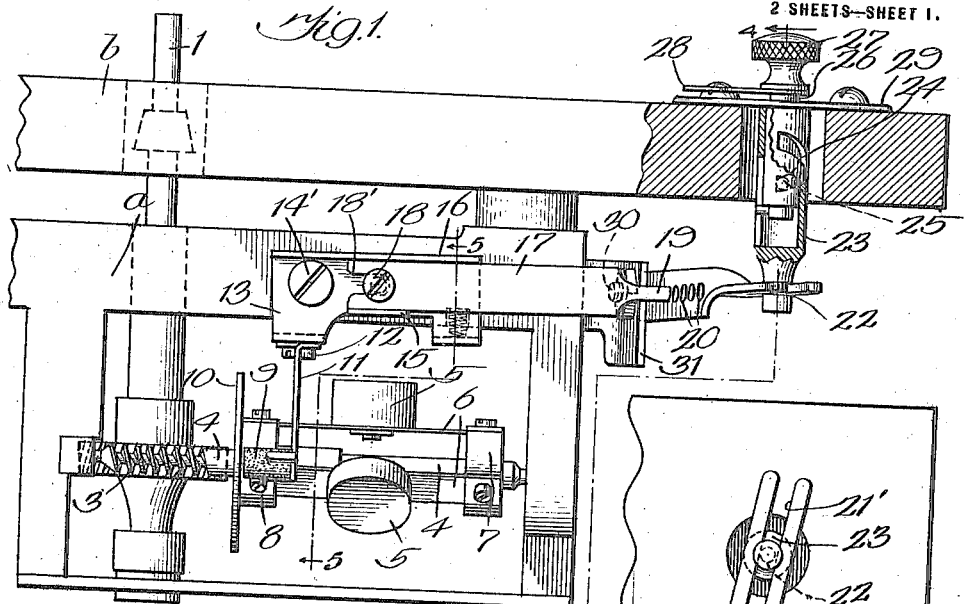
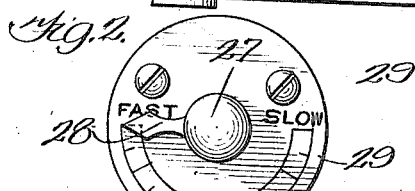
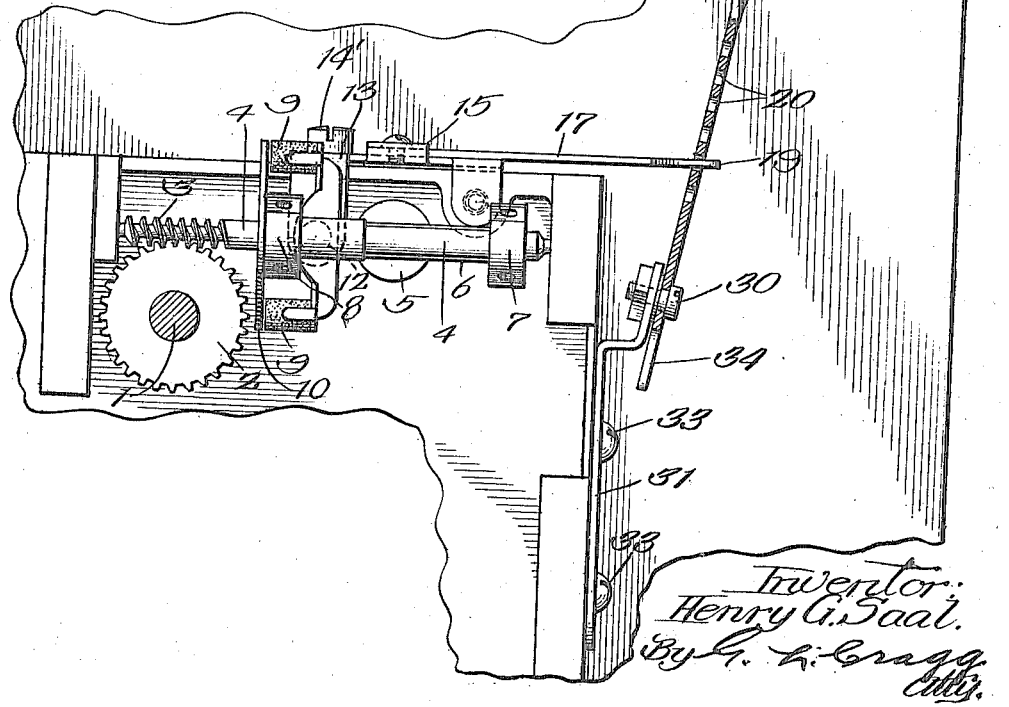
Inventor:
Henry G. Saal.
By G. L. Cragg
Atty.

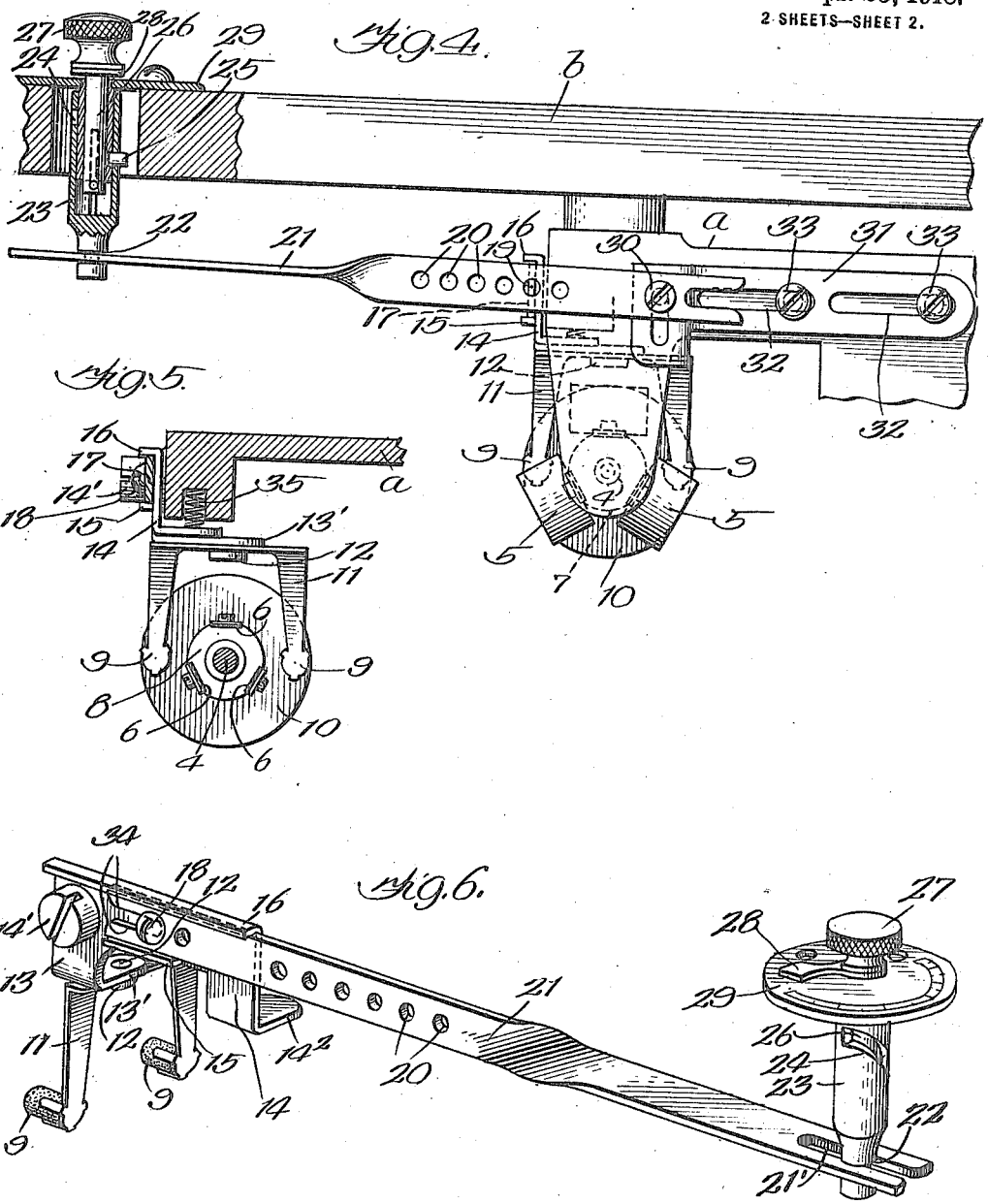

UNITED STATES PATENT OFFICE.

HENRY G. SAAL, OF CHICAGO, ILLINOIS.

BRAKING MECHANISM.

1,263,806.      Specification of Letters Patent.      Patented Apr. 23, 1918.

Application filed June 21, 1917.   Serial No. 176,005.

*To all whom it may concern:*

Be it known that I, HENRY G. SAAL, citizen of the United States, residing at Chicago, in the county of Cook and State of Illinois, have invented a certain new and useful Improvement in Braking Mechanism, of which the following is a full, clear, concise, and exact description.

My invention relates to brakes and particularly to the lever mechanism that moves one member of a brake with respect to its companion member. The mechanism of my invention is of particular service when employed in connection with brakes that are used for automatically regulating the speed of phonographic record supporting shafts and when my invention is thus embodied it embraces means for adjusting the position of a normally stationary brake member that is engageable by a companion brake member whose movement is determined by the speed of the record supporting shaft.

My invention has for one of its objects the provision of means whereby a given movement of a hand actuated brake adjusting device may cause differing adjustments of the normally stationary brake member, a result which is effected by a rearrangement of the lever mechanism that intervenes between the hand actuated device and the normally stationary brake element. This hand actuated device is desirably provided with an index to denote various speeds which the braking appliance may maintain.

As I have practised the invention two articulated levers intervene between the normally stationary brake member and the hand actuated device and these articulated levers are so constructed that one of them may alone couple the normally stationary brake member with the hand actuated device.

My invention has another characteristic which resides in the employment of a spring that exerts pressure upon the normally stationary brake member, rather than the mounting for this member, whereby the adjusting lever mechanism need not mainly be relied upon to hold the stationary brake member in its selected position, the spring avoiding loose movements that might occur between the stationary brake member and the lever mechanism if the spring were absent.

I will explain my invention more fully by reference to the accompanying drawings showing the preferred embodiment thereof and in which Figure 1 is a view in elevation, partially in section, illustrating the mechanism of my invention; Fig. 2 is a plan view of the hand actuated device in conjunction with the index with which it is preferably provided; Fig. 3 is a bottom view, partially in section, of the structure illustrated in Fig. 1; Fig. 4 is a view on line 4—4 of Fig. 1; Fig. 5 is a view on line 5—5 of Fig. 1; and Fig. 6 is a perspective view illustrating the relation that is effected between the hand actuated device and the normally stationary brake element by means of one lever instead of the two articulated levers that are elsewhere illustrated.

Like parts are indicated by similar characters of reference throughout the different figures.

The governor illustrated is shown as being associated with a shaft 1 that is adapted for the operation of a turn table for supporting a disk phonographic record, this shaft supporting a worm wheel 2 engageable by a worm 3 provided upon the governor shaft 4. In accordance with common practice the shaft 1 is driven by a spring motor through gearing which is not illustrated, the gear wheel 2 being added in order that the shaft 1 may drive the worm 3 to rotate the governor shaft 4 for the purpose of operating the centrifugal governor 5 to maintain the speed of the turn table substantially constant. This centrifugal governor is of a common form, the weights thereof being mounted upon intermediate portions of the resilient strips 6. Each of these resilient strips is mounted at one end upon a sleeve 7 rigidly secured to the shaft 4, the other end of the resilient strip being connected with a collar 8 that is movable along the shaft 4 and with respect to the brake pads 9. The collar 8 is in fixed relation to a brake disk 10 which engages the pads 9 when the governor shaft 4 reaches a predetermined speed whereby the speed of the turn table shaft 1 is controlled.

The brake pads 9 constitute the normally stationary brake member, these pads, however, being desirably mounted at the ends of a U-shaped mounting 11 that straddles the governor shaft 4 and positions the brake pads at diametrically opposite points with reference to the brake disk. The U-shaped mounting 11 is, in accordance with common practice, pivotally mounted at its intermediate portion as indicated at 12 whereby the mounting 11 will oscillate through a slight range to adapt the pads to inequalities in the face of the disk 10 engageable with the pads. The pads 9 are thus substantially stationary, a slight compensating movement afforded therefor for the purpose stated not materially changing the normal position which is adjustably determined by the mechanism of the invention. The U-shaped mounting 11 is connected at 12 with the off set portion 13¹ of the arm 13 of the bell crank whose elbow is pivotally connected at 14¹ with the case or frame $a$ upon which the spring motor and the governor are mounted as a unit, and, as a unit, are attachable to the top board or wall $b$ of the phonograph casing. The offset portion 13¹ of the arm 13 of the bell crank is disposed parallel to the axis of rotation of the bell crank while the arm 14 of the bell crank is in the plane of movement of the bell crank. By swinging the bell crank the U-shaped mounting 11 is adjustable toward or from the brake disk whereby the normal position of the brake pads may be selected. As clearly illustrated in Figs. 1, 3 and 4 the bell crank arm 14 carries two ledges 15, 16 between which a lever 17 is disposed whereby the lever 17 may be held in substantially rigid relation with the bell crank after the clamping screw 18 (which is in threaded engagement with the bell crank) has been turned to have its head brought into clamping engagement with the lever 17. For ease in assembly the end of the lever 17 which is engaged by the screw 18 is of fork shape as indicated at 18¹, the shank of the screw being received between the furcations of the fork. The other end of the lever 17 is reduced to form a tongue 19 that may be passed through any selected one of a number of openings 20 in another lever 21 which is articulated with the lever 17 in this manner. The lever 21 has a fork shaped end 21¹ whose furcations are received in the annular groove 22 formed in the lower extension of the cylindrical barrel 23. The barrel 23 has a spiral cam groove that receives a pin 25 projecting radially from a rod 26. The upper end of this rod carries a knurled button 27 and an index or pointer 28, this pointer slipping over a speed scale 29. By turning the knurled button 27 the rod 26 is turned to turn the pin 25. As the pin 25 operates in the spiral cam groove 24 the barrel 23 is raised or lowered according to the direction of rotation of the button 27 whereby the lever 21 is swung upon the shank of the fulcrum screw 30. Swinging movement of the lever 21 in its plane causes swinging movement in a similar direction of the lever 17 although the planes of movement of these two levers are transversely related. When the lever 17 is swung it causes a corresponding swinging movement of the bell crank whereby the mounting 11 is moved toward or away from the brake disk 10 to define the substantially stationary normal position of the brake pads 9. A given vertical movement of the barrel 23 may cause the movement of the lever 21 through an angle which is adjustably determined by selecting the location of the fulcrum 30 with respect to the barrel 23, the fork 21¹ permitting a shifting of the fulcrum without breaking the operating connection between the lever 21 and the barrel 23. Means by which the adjustment of the fulcrum 30 is permitted desirably resides in a bracket 31 that supports the fulcrum screw 30 at one end and has slots 32 (Fig. 4) extending longitudinally thereof through which the shanks of clamping screws 33 pass. By loosening the screws 33 the bracket 31 may be moved toward or away from the barrel 23 to adjust the distance between the fulcrum 30 and said barrel to vary the swing of the lever 21 for a given movement of the button 27 and consequently to vary the swing of the lever 17 and the adjusting movement of the support 11 for a given movement of the button 27. Whenever the position of the fulcrum 30 is adjusted with respect to the barrel 23 the tongue 19 on the lever 17 is to be placed within a new hole 20 in the lever 21, a series of holes 20 being preferred to a continuous slot to enable the lever 21 to be made of desired strength.

If it should be desired to dispense with the lever 17 the lever 21 may be substituted therefor as indicated in Fig. 6 and when the construction is thus arranged the lever 21 is projected beyond its fulcrum point to form a fork 34 that is engageable with the screw 18 and the ledges 15 and 16 as illustrated in Fig. 6. The assembly of the lever 21 with the bell crank as exhibited in Fig. 6 is similar to the assembly lever 17 with the bell crank as exhibited in Figs. 1 and 3, with the exception that the hand operated device that includes the elements 23, 27, etc., shown at the right of Fig. 6, has a different location from the location given this hand operated device when the lever 17 is also employed.

In order that the lever mechanism 17, 21 may be primarily merely a positioning means and not a means directly relied upon to hold the bell crank in exactly the position to which it is adjusted I provide an offset 14² in the arm 14 of the bell crank this offset 14² extending parallel with the axis of movement of the bell crank. The offset portion 14² constitutes a seat for a spring 35 (Fig. 5) that is mainly contained in a recess 36 in the frame $a$ but which spring projects from the frame $a$ into engagement with the bell crank arm portion 14² to exert downward pressure upon the bell crank or brake member carrier preferably in a clockwise direction. The spring 35 thus serves to hold the support 11 and the brake pads 9 in the position permitted by the angularly related levers 17—21 whereby the lever mechanism is not finally relied upon to hold the brake pads initially in their selected position. By this arrangement the loose connections between the bell crank and the operating device 23 are prevented from disturbing the nice adjustment to which the support 11 is brought.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Braking mechanism including brake pads; a U-shaped support carrying a brake pad upon each of its ends; a bell crank having one of its arms provided with an offset portion extending substantially parallel with the axis of movement of the bell crank and to which offset arm portion an intermediate portion of the aforesaid support is pivotally connected; lever mechanism for adjusting the position of said bell crank; and a spring engaging and operating upon said bell crank, the other arm of the bell crank also having an offset portion extending substantially parallel with the axis of movement of the bell crank, this offset arm portion being engaged by said spring.

2. Braking mechanism including brake pads; a U-shaped support carrying a brake pad upon each of its ends; a bell crank having one of its arms provided with an offset portion extending substantially parallel with the axis of movement of the bell crank and to which offset arm portion an intermediate portion of the aforesaid support is pivotally connected; lever mechanism for adjusting the position of said bell crank; and a spring engaging and operating upon said bell crank.

3. Braking mechanism including brake pads; a U-shaped support carrying a brake pad upon each of its ends; a bell crank having one of its arms provided with an offset portion extending substantially parallel with the axis of movement of the bell crank and to which offset arm portion an intermediate portion of the aforesaid support is pivotally connected; and lever mechanism for adjusting the position of said bell crank.

4. Braking mechanism including brake pads; a U-shaped support carrying a brake pad upon each of its ends; a bell crank to one of whose arms an intermediate portion of the aforesaid support is pivotally connected; lever mechanism for adjusting the position of said bell crank; and a spring engaging and operating upon said bell crank, the other arm of the bell crank also having an offset portion extending substantially parallel with the axis of movement of the bell crank, this offset arm portion being engaged by said spring.

5. Braking mechanism including a brake member; a bell crank carrying said brake member; lever mechanism for adjusting the position of said bell crank, an arm of the bell crank having ledges engaging a portion of said lever mechanism that is disposed between said ledges; and means for clamping said portion of the lever mechanism and said bell crank arm together.

6. Braking mechanism including a brake member; a bell crank carrying said brake member; lever mechanism for adjusting the position of said bell crank and including two articulated angularly related levers, an arm of the bell crank having ledges engaging one of said levers that is disposed between said ledges, this lever having a fork shaped end; a screw passing between the furcations of said fork shaped end into connection with the bell crank for clamping this fork shaped end in engagement with the bell crank; and a fulcrum connection at one end of the other lever, this other lever projecting beyond said fulcrum connection and there being of fork shape, this fork shaped end being adapted for interposition between the aforesaid ledges and capable of receiving the aforesaid screw whereby the second lever may be substituted for the first lever in connection with the bell crank.

7. Braking mechanism including a brake member; a bell crank carrying said brake member; lever mechanism for adjusting the position of said bell crank and including two articulated angularly related levers; means for fastening one of said levers to the bell crank, this lever having formation complemental to said means to coöperate therewith in effecting its assembly with the bell crank; and a fulcrum connection at one end of the other lever, this other lever projecting beyond said fulcrum connection and there having formation also complemental to the aforesaid fastening means whereby the second lever may be substituted for the first lever in connection with the bell crank.

8. Braking mechanism including a brake member; a bell crank carrying said brake member; lever mechanism for adjusting the position of said bell crank and including two articulated angularly related levers; and means for fastening one of said levers to the bell crank, this lever having formation complemental to said means to coöperate therewith in effecting its assembly with the bell crank, the other lever also having formation complemental to said means to coöperate therewith in effecting its assembly with the bell crank.

9. Braking mechanism including a brake member; a bell crank carrying said brake member; lever mechanism for adjusting the position of said bell crank and including two articulated angularly related levers, one connected with the bell crank at one end and at its other end connected with the other lever between the operating end of this other lever and its fulcrum; and means whereby the space between said fulcrum of the second lever and the place of articulation of the levers may be varied.

10. Braking mechanism including a brake member; a bell crank carrying said brake member; lever mechanism for adjusting the position of said bell crank and including two articulated angularly related levers, one connected with the bell crank at one end and at its other end in changeable engagement with and along the other lever between the operating end of this other lever and its fulcrum; and means for moving the fulcrum of the second lever toward and away from the first lever.

11. Braking mechanism including a brake member; a bell crank carrying said brake member; lever mechanism for adjusting the position of said bell crank and including two articulated angularly related levers, one connected with the bell crank at one end and at its other end in changeable engagement with and along the other lever between the operating end of this other lever and its fulcrum; and a mounting upon which the second lever is fulcrumed and which mounting is in adjustable position toward and from the first lever.

12. Braking mechanism including a brake member; a carrier for said brake member; lever mechanism for adjusting the position of said carrier and including two articulated angularly related levers; and means for fastening one of said levers to the carrier, this lever having formation complemental to said means to coöperate therewith in effecting its assembly with the carrier, the other lever also having formation complemental to said means to coöperate therewith in effecting its assembly with the carrier.

13. Braking mechanism including a brake member; a carrier for said brake member; lever mechanism for adjusting the position of said carrier and including two articulated angularly related levers, one connected with the carrier at one end and at its other end connected with the other lever between the operating end of this other lever and its fulcrum; and means whereby the space between said fulcrum of the second lever and the place of articulation of the levers may be varied.

14. Braking mechanism including a brake member; a carrier for said brake member; lever mechanism for adjusting the position of said carrier and including two articulated angularly related levers, one connected with the carrier at one end and at its other end in changeable engagement with and along the other lever between the operating end of this other lever and its fulcrum; and means for moving the fulcrum of the second lever toward and away from the first lever.

15. Braking mechanism including a brake member; a carrier for said brake member; lever mechanism for adjusting the position of said carrier and including two articulated angularly related levers, one connected with the carrier at one end and at its other end in changeable engagement with and along the other lever between the operating end of this other lever and its fulcrum; and a mounting upon which the second lever is fulcrumed and which mounting is in adjustable position toward and from the first lever.

HENRY G. SAAL.